US008630299B1

(12) United States Patent
Afshar et al.

(10) Patent No.: US 8,630,299 B1
(45) Date of Patent: Jan. 14, 2014

(54) CUSTOMER PREMISES EQUIPMENT BORDER ELEMENT FOR VOICE OVER INTERNET PROTOCOL SERVICES

(75) Inventors: Siroos K. Afshar, Manalapan, NJ (US); Gerald M. Ezrol, Herndon, VA (US); Stephen Fisher, Mountain View, CA (US); Samuel Glazer, New York, NY (US); Radhika R. Roy, Howell, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1150 days.

(21) Appl. No.: 11/239,753

(22) Filed: Sep. 30, 2005
(Under 37 CFR 1.47)

(51) Int. Cl.
*H04L 12/28* (2006.01)
*H04J 3/22* (2006.01)

(52) U.S. Cl.
USPC .......................................... 370/401; 370/466

(58) Field of Classification Search
None
See application file for complete search history.

(56) References Cited

U.S. PATENT DOCUMENTS

| | | | |
|---|---|---|---|
| 5,838,683 A | 11/1998 | Corley et al. | |
| 5,875,234 A | 2/1999 | Clayton et al. | |
| 5,933,490 A | 8/1999 | White et al. | |
| 6,026,087 A | 2/2000 | Mirashrafi et al. | |
| 6,064,653 A | 5/2000 | Farris | |
| 6,185,204 B1 | 2/2001 | Voit | |
| 6,430,176 B1 | 8/2002 | Christie, IV | |
| 6,434,139 B1 | 8/2002 | Liu et al. | |
| 6,470,020 B1 | 10/2002 | Barker et al. | |
| 6,829,254 B1* | 12/2004 | Rajahalme et al. | 370/535 |
| 7,366,159 B1* | 4/2008 | Parlamas et al. | 370/352 |
| 2001/0046234 A1* | 11/2001 | Agrawal et al. | 370/402 |
| 2002/0103898 A1* | 8/2002 | Moyer et al. | 709/224 |
| 2002/0141389 A1* | 10/2002 | Fangman et al. | 370/352 |
| 2005/0018652 A1* | 1/2005 | Crouch et al. | 370/352 |
| 2005/0030952 A1* | 2/2005 | Elmasry et al. | 370/395.2 |
| 2005/0068944 A1* | 3/2005 | Schmidt | 370/352 |
| 2005/0070230 A1* | 3/2005 | Das et al. | 455/69 |
| 2005/0074111 A1* | 4/2005 | Hanson et al. | 379/212.01 |
| 2005/0076108 A1* | 4/2005 | Li et al. | 709/223 |
| 2005/0125696 A1* | 6/2005 | Afshar et al. | 713/201 |
| 2005/0207413 A1* | 9/2005 | Lerner | 370/389 |
| 2006/0039367 A1* | 2/2006 | Wright et al. | 370/382 |
| 2006/0177044 A1* | 8/2006 | O'Neil et al. | 379/373.02 |
| 2007/0019545 A1* | 1/2007 | Alt et al. | 370/230 |
| 2007/0094412 A1* | 4/2007 | Sollee | 709/245 |
| 2008/0107130 A1* | 5/2008 | Peters et al. | 370/466 |
| 2010/0309906 A1* | 12/2010 | Ramachandran et al. | 370/352 |

FOREIGN PATENT DOCUMENTS

EP 0 848 560 B1 4/2002

OTHER PUBLICATIONS

Y.C. Shou, "Control and Management of Home Networks Using a CORBA Enabled Residential Gateway," 2001, School of electrical and INformation Engineering.*

(Continued)

*Primary Examiner* — Man Phan
*Assistant Examiner* — Ryan Kavleski (57) ABSTRACT

A customer premises border element is disclosed that functions as an interface between devices, such as SIP devices located on a customer's premises, and a border element located in the service provider's network. Such customer premises border elements are advantageous in that they are relatively inexpensive since they only have to support devices located on the customer's premises. At the same time, by performing a number of functions, such as media transcoding and a portion of call processing, it reduces the processing requirements of network border elements.

9 Claims, 5 Drawing Sheets

(56) References Cited

OTHER PUBLICATIONS

U.S. Appl. No. 60/700,949 "Security for Inter-Domain VOIP Communications Networks."*

Victoria Fineberg, "A Practical Architecture for Implementing End-to-End QoS in an IP Network," Jan. 2002, IEEE Communications Magazine, vol. 40 Issue 1, pp. 122-130.*

Maria Cuevas, "Admission Control and Resource Reservation for Session-based Applications in Next Generation Networks," Apr. 2005, BT Technology Journal, vol. 23, No. 2, pp. 130-145.*

H. Schulzrinne, "RFC 3550: RTP: A Transport Protocol for Real-Time Applications," Network Working Group, Jul. 2003, p. 1-89.*

G. Camarillo, "RFC 3312: Integration of Resource Management and Session Initation Protocol (SIP)," Oct. 2002, Network Working Group, p. 1-29.*

* cited by examiner

CUSTOMER PREMISES EQUIPMENT BORDER ELEMENT FOR VOICE OVER INTERNET PROTOCOL SERVICES

BACKGROUND OF THE INVENTION

Telecommunication services for voice and multimedia (e.g., audio, video, and data) have traditionally been provided using networking technologies such as public switched telephone networks (PSTN). Typically, in such networks, voice signals are converted to digital form and time division multiplexing (TDM) is used to allocate different conversations to periodic time slots. More recently, other networking technologies have been used to carry voice and multimedia information. Such technologies include internet protocol (IP), a formal set of rules for sending data across the internet; frame relay (FR), a telecommunication service providing variable-sized data packets for cost-efficient data transfer; and asynchronous transfer mode (ATM), a high speed networking standard. Such networks provide a single, common and shared infrastructure, thus flexibly enabling a potentially wide variety of new applications and services for customers.

Networks using these technologies employ a variety of call control services using a variety of protocols, for example, integrated services digital network user part (ISUP)-over-TDM, H.323-over-IP and session initiation protocol (SIP)-over-IP. The H.323 standard is a comprehensive and very complex suite of protocols that provide specifications for real-time, interactive videoconferencing, data sharing and audio applications such as IP telephony. Alternatively, the SIP protocol is advantageous as it is a streamlined protocol developed specifically for IP telephony in view of popular web-based services. More efficient than H.323, SIP takes advantage of existing protocols to handle certain parts of the call control process. For example, Media Gateway Control Protocol (MGCP), or H.248 protocol, is used between the signaling call control entity and the media gateway entity in a master-slave scheme, while SIP works as a peer-to-peer protocol between the signaling entities (e.g., call entity of MGCP or H.248) along with an indication of what media needs to be used by the media entities. Therefore, SIP can take the advantage of the master-slave protocol like MGCP or H.248 that is being used to provide the media control function of the devices satisfying the needs of SIP in order to set up the session. It may be noted that the media devices may be connected to the circuit-switched based networks, like PSTN.

Regardless the standard, as traditional PSTN networks migrate toward other networking technologies and protocols they must interface with networks using differing protocols (e.g., traditional PSTN networks). However, developing a single common cost-efficient architecture for real-time communication services for audio, video, and data that supports multiple existing call control protocols (e.g., PSTN, SIP and H.323) is difficult. Many telecommunications providers are selecting IP as the access technology for new telecommunications networks that carry voice, data and multimedia information. Such networks are often referred to as Voice over IP (VoIP) networks. Many such providers are using a core network that uses the SIP protocol for signaling and call flow operations. Such SIP-based VoIP networks are advantageous in that they use the same access technology (IP) as many other networks, such as the Internet, which facilitates transmitting information to a wide range of destinations. However, while SIP-based telecommunications networks are advantageous, not all networks and components support SIP or, if the do support the SIP protocol, may not support the same version of SIP. Different call control mechanisms and versions of signaling protocols over the IP networks may use different communication protocols. Therefore, there is a need to permit SIP networks to coexist with more traditional networks, such as circuit-switched networks, and/or IP networks operating with a different protocol.

To address this need, IP telecommunications networks typically rely on network-based border elements (BEs) to provide an interface between a customer's premises into the VoIP network infrastructure. Such network-based BE's are located within the service provider network and are used to translate between the protocol of a customer network and the SIP protocol used by the VoIP network as a common call control signaling protocol among different functional entities of the VoIP common infrastructure. BE's also function as Back-To-Back User Agents (B2BUAs) in that they receive and process all requests for communication services, such as SIP INVITE messages, and process those requests to determine how they should be answered. In this capacity, such BE's also maintain complete call state information for requests it receives. In their B2BUA capacity, these BEs also perform a wide variety of other functions, including signaling, call admission control, media control and security functions.

Network-based border elements are typically designed to cover large geographic areas and provide service to many customers simultaneously. As a result, such border elements are typically very robust and are typically very expensive to install, maintain and operate. When installed, each customer using, for example, a SIP-based device will interface directly or indirectly with a SIP BE. Thus, some present BE implementations typically require each SIP-based device to be connected to a service provider network. Such an implementation requires that each of the devices have the hardware and software necessary to interface with the BE. Also, each connection requires its own setup and dedicated network resources. Therefore, such an implementation having individual connections is relatively costly.

In another, less costly attempt, one or more SIP proxies located at the customer premises are used to connect two or more SIP devices to a SIP BE in the provider's network. In this attempt, the only direct connection to the BE is via the SIP proxy and, as a result, such an implementation does not require device hardware and software necessary to connect to the network BE nor does it require as many network resources. However, due to lack of standardization, SIP proxies typically lack the functionality of a service provider BE, such as the aforementioned B2BUA functions. Additionally, such proxies typically do not perform other BE functions, such as firewall and network address translation functions, VoIP Quality of Service (QoS) control, media relay, media transcoding, resource utilization control and other associated functions.

SUMMARY OF THE INVENTION

While current border elements are advantageous in many applications, the present inventors have recognized that these border elements are also disadvantageous in certain regards. Specifically, border elements located in a network are very costly to operate and maintain since they need to support users in a wide geographic area.

The present inventors have invented a customer premises border element (CPBE) that acts as an interface between devices, such as SIP devices located on a customer's premises, and a border element located in the service provider's network. Fundamentally, unlike network-based BEs, the CPBE consists of single physical entity that provides premises-based network call routing, call admission control/ QOS and media transcoding/media relay functions. Such customer premises border elements are relatively inexpensive since they only have to support devices located on the customer's premises. At the same time, by performing a number of functions, such as media transcoding, call routing, call admission control/QoS, VoIP Firewall/NAT functions and a portion of call processing, it reduces the processing requirements of network border elements and other network components and allows such network border elements to be more scalable.

In a first embodiment, a customer premises border element receives a message at a first border element from a SIP-based communication device, and sends a message from said first border element to a second border element located in a service provider network. An address associated with at least a first message received from a customer device located at said customer premises is translated to an address associated with said second border element located in said service provider network. In a second embodiment, the customer premises border element uses a firewall to control messages sent to and from that border element. Such a border element also may, in yet another embodiment, relay at least a first media stream from a first border element to another border element located at a customer premises and may, illustratively, transcode at least a first media stream from a first format to a second format. The customer premises border element in accordance with the principles of the present invention may receive from a network border element a message indicative of at least a first quality of service to be provided to a call and to control the quality of service of that call.

Finally, a CPBE in accordance with another embodiment of the present invention can perform functions specific to the customer premises that can reduce the complexity and processing requirements of a network BE. For example, a CPBE can accomplish call routing of calls originating either from within or external to the customer premises network to destinations within a customer premises. Such a CPBE can also perform call admission control/QoS in the premises network, transcoding based on policies set at the customer premises, media relay, VoIP FW/NAT crossing, or any other function specific to the customer premises that would lower the processing requirements of the network BE.

These and other advantages of the invention will be apparent to those of ordinary skill in the art by reference to the following detailed description and the accompanying drawings.

DETAILED DESCRIPTION OF THE INVENTION

Figure 1:
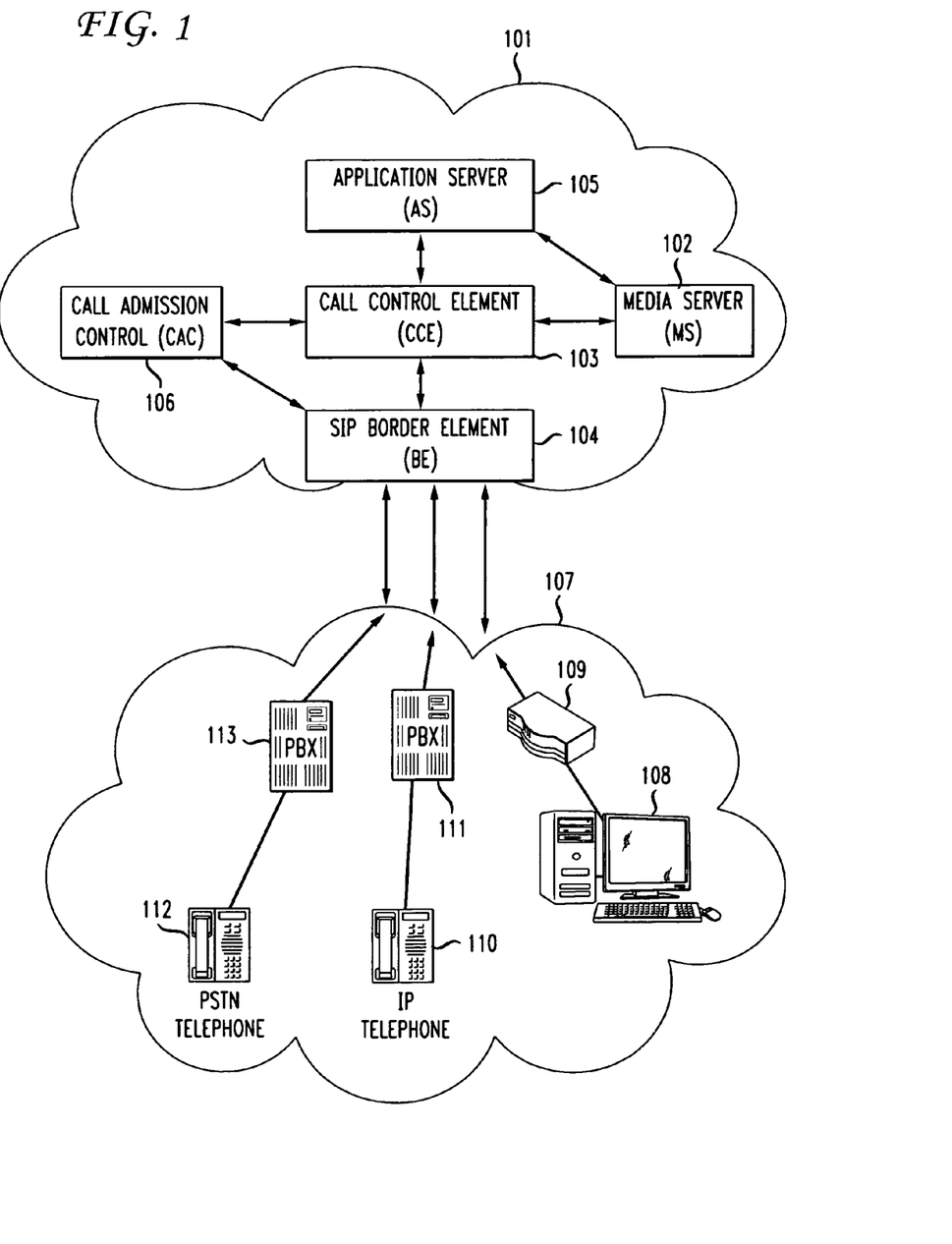
FIG. 1 shows a prior art data network for transmitting telephony signals.

FIG. 1 shows a portion of a telecommunications network, specifically an IP-based telecommunication network 101 that interfaces with one or more networks, such as illustrative customer network 107. Network 107 is, illustratively, an Internet Protocol (IP) communications network at a customer premises that has, illustratively, Public-Switched Telephone Network (PSTN) telephone 112, IP telephone 110 and computer 108. Each of these devices is connected to network 101 through network 107 using, respectively, PBX 113, PBX 111 and network switch 109. IP networks, such as network 107, are used to transmit information from one IP address to another IP address by encapsulating that information into IP packets that each have, for example, addressing information in a header of each packet. This header is used by switches/routers in the IP network to route the packets to the intended destination and are, therefore, referred to as IP-switched networks. Such IP networks are well-known in the art and, therefore, will not be further described herein.

As is also well-known, more traditional telecommunications networks (e.g., traditional PSTN networks) did not use IP packets to transmit information and, instead, relied upon time division multiplexing (TDM) of signals in a circuit-switched method to transmit signals to a destination node. One skilled in the art will recognize that, since network 107 is an illustrative IP network, the traffic originating from PSTN telephone 112 (which is typically associated with a circuit-switched network) will require conversion to IP packets in order for the call to be transmitted over network 107. This conversion may take place at illustrative PSTN telephone 112 or, alternatively, this conversion may illustratively take place at PBX 113. One skilled in the art will recognize that this conversion may take place at any network node in the path of transmission of a call from PSTN telephone 112 to network 101 through network 107.

Network 101 is, illustratively, a VoIP network operated by a telecommunications service provider that uses a specific protocol, such as the well-known session initiation protocol (SIP), as a single common internal signaling and call control protocol used by all VoIP infrastructure components within the network 101. Illustrative network 101 has call control element (CCE) 103, application server (AS) 105, call admission control server (CAC) 106 and media server (MS) 102. It may be necessary to interface network 101 with many different customer networks using many different communication protocols, such as SIP, H.323, TDM and/or any other protocol. Thus, in order to support communications to and from these networks, a gateway into network 101 for translating signals and media (e.g., calls) from one protocol to another is necessary. As discussed above, this function is typically performed by one or more interface nodes, called border elements (BEs), located at the border of the service provider's core VoIP network. In addition to translating from one protocol to another, as discussed above, BE's also function as gatekeeper Back-To-Back User Agents (B2BUAs) to customer nodes in that they receive and process all requests for communication services to determine how they should be answered. In this capacity, such BE's maintain complete call state information for received requests and also perform a wide variety of other functions, including signaling, call admission control, media control and security functions.

When a BE receives a request for call set-up, it then relays that request using the above functions to other network nodes, such as the CCE and CAC which then operate to dedicate resources to calls. Border elements also typically have a media element to handle and process media using a variety of different protocols at different levels. For example, one skilled in the art will recognize that the media element of a border element must be able to identify, route and process media streams conforming to the Real Time Transport Protocol (RTP), which is the Internet-standard protocol for the transport of real-time data, including audio and video. RTP is a high level protocol that can operate over many different network transport protocols, including IP networks. The RTP protocol is used in conjunction with quality of service and timing mechanisms and protocols (e.g., the well known Resource Reservation Protocol, or RSVP) to ensure that time-sensitive media streams are delivered to destinations within tight timing tolerances.

In addition to the above processing abilities, the media element of a border element also typically acts to detect signals that do not require media processing, such as well known Dual-Tone Multi-Frequency (DTMF) signals. The media element transmits those signals to the appropriate application server for any further necessary processing. Finally, the media element of a BE also may perform media transcoding to facilitate transmission of multimedia streams across the core network to destinations. Such transcoding is accomplished any time a destination of a call does not support a particular coder/decoder format or media type. For example, if a combined audio/video message is transmitted to a non-video capable terminal, transcoding may take place to transmit only the audio portion of the call in a format understood by the destination terminal. Similarly, if the destination terminal is video-capable, but does not support the video format transmitted, transcoding will be used to manipulate the video into a format understood by the destination terminal. Another example would be in text-to-speech systems. In this case, the transcoding element would manipulate the media streams to transform those streams into the desired format for further transmission.

In the illustrative example of FIG. 1, a single SIP border element is used to interface with network 107 which is, in this illustrative example, using the SIP communications protocol for signaling and call control within network 107. One skilled in the art will fully appreciate that a single network 107 interfacing with network 101 is merely illustrative in nature. The number and type of border elements in network 101 is purely an architectural issue to be selected based on the desired design of the network. Therefore, as is suggested above, SIP border elements, TDM border elements and other such border elements may be used to translate the calls sent to and received from different customers' networks using any number of different protocols.

As discussed above, in traditional networks, border elements are typically designed to cover large geographic areas and provide service to many calls simultaneously. As a result, such border elements are typically costly to install, maintain and operate. When installed, each customer using, for example, a SIP-based device may interface directly or indirectly with a SIP BE. Such an implementation, therefore, requires that each of the devices have the hardware and software necessary to support this interface. Also, since each connection between the BE and a device requires its own setup process and dedicated network resources, such an implementation is relatively costly to both the network service provider and the end user. As also discussed above, in another, less costly attempt, one or more SIP proxies located at the customer premises are used to connect two or more SIP devices to a SIP BE in the provider's network. While the network resource and device hardware requirements are lower, and therefore less costly, SIP proxies typically lack the functionality of a service provider BE.

Figure 2:
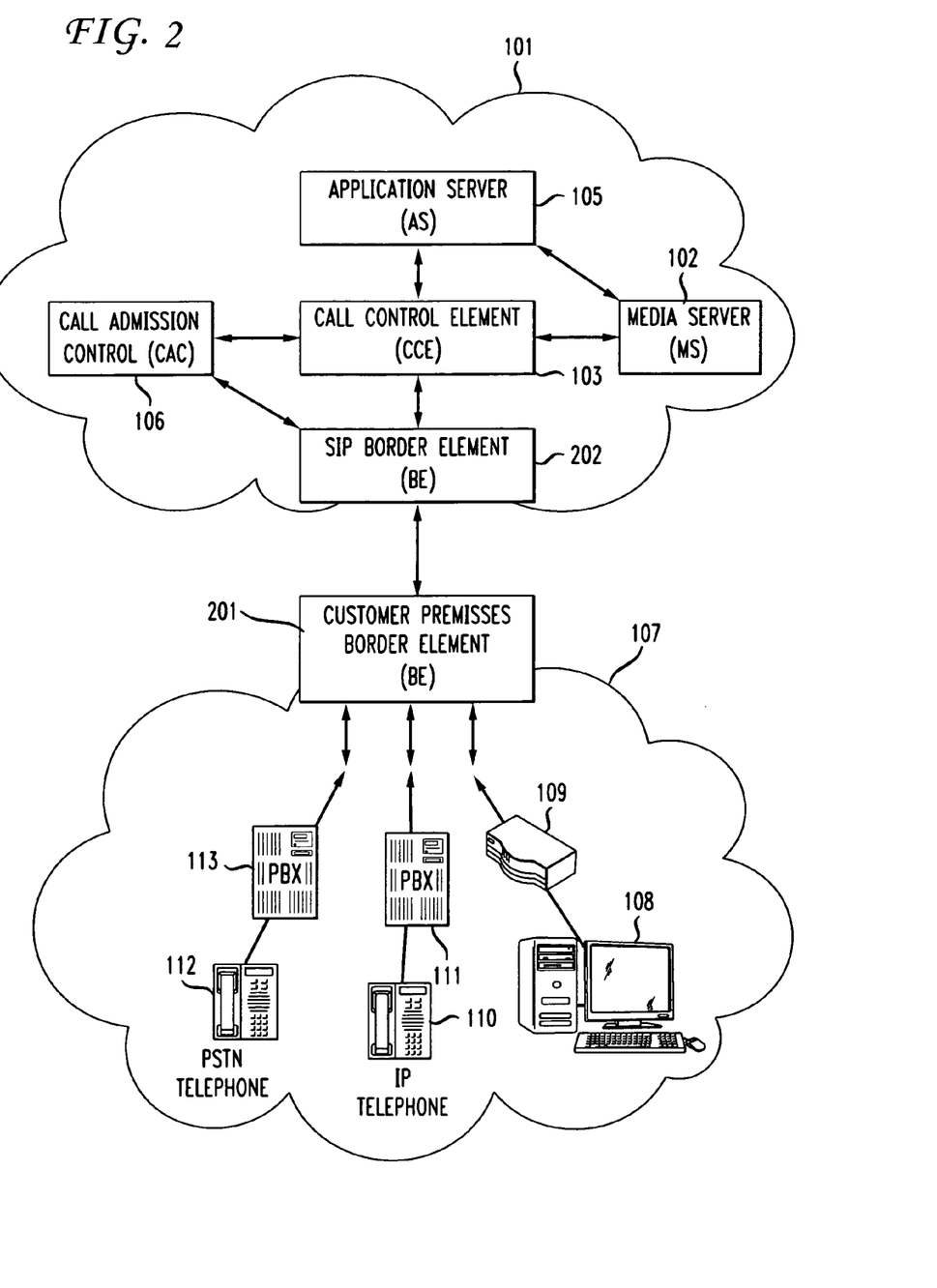
FIG. 2 shows a network in accordance with the principles of the present invention wherein a border element is used at a customer premises.

FIG. 2 shows one embodiment of a network in accordance with the principles of the present invention in which instead of using a border element to provide telecommunication services to multiple, geographically diverse customers, a single border element is used to provide service to the users located at a single customer premises. Specifically, referring to FIG. 2, network 107 is, once again, an Internet Protocol (IP) communications network at a customer premises that has, illustratively, Public-Switched Telephone Network (PSTN) telephone 112, IP telephone 110 and computer 108 as described above. Each of these devices is connected to, respectively, PBX 113, PBX 111 and network switch 109. However, unlike the network of FIG. 1, where each of these devices connected directly to a network border element, such as BE 104 in FIG. 1, each of the devices at the customer premises connects to a local border element herein referred to as a Customer Premises Border Element (CPBE) 201. CPBE 201 then provides a single connection point for network BE 202 in the service provider's VoIP network 104. Once again, network 101 also has, for example, CCE 103, AS 105, MS 102 and CAC 106 that perform VoIP network functions as described above. CPBE 201, described more fully below, differs from BE 104 in FIG. 1 in that CP BE 201 may be physically located at the customer premises.

Figure 3:
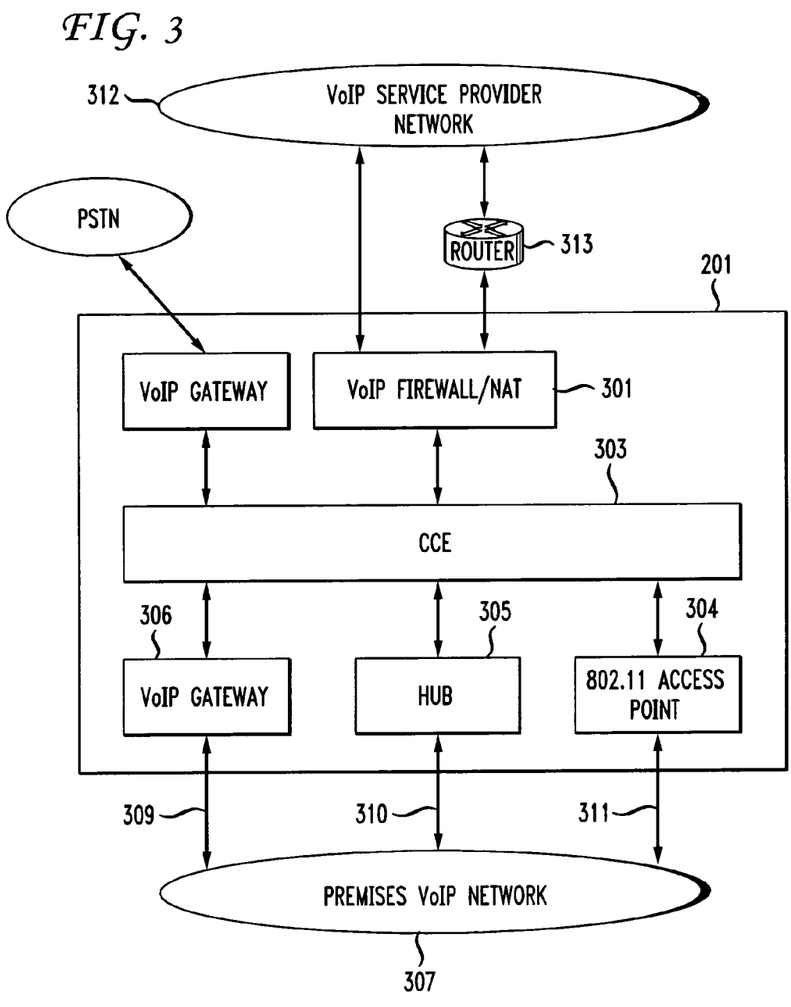
FIG. 3 shows a diagram of one illustrative embodiment of a CPBE in accordance with the principles of the present invention.

FIG. 3 shows a diagram of one illustrative embodiment of a CPBE in accordance with the principles of the present invention. Specifically, CPBE 201 is a border element that is, for example, located at the customer premises and is connected to the customer premises VoIP network 307 via connections 309, 310 and 311. The CPBE 201 has, for example, access interfaces through which devices in network 307 connect to the CPBE 201. Illustratively, FIG. 3 shows VoIP gateway 306, Hub 305 and 802.11 access point 304 to allow circuit-based telephony traffic, packet voice traffic and 802.11 packet voice traffic, respectively, to connect to the CPBE 201. CPBE also has CCE 303 functionality, discussed below, that is similar to the functionality provided by a CCE in the VoIP provider's network, such as CCE 102 in FIGS. 1 and 2. CPBE 201 also has a VoIP firewall/network address translator (NAT) 301 function that allows secure communication to the VoIP service provider network 312. One skilled in the art will recognize that this communication may occur over a direct connection to, for example, a network border element in network 312 or, alternatively, may be routed via a router, such as router 313, to a desired location within network 312.

CCE 303 in CPBE 201 performs the primary call processing functionality for calls between network 307 and network 312. As discussed previously, the CPBE 201 will also appear as a SIP proxy to all SIP-based VoIP customer premises equipment and will function as a back to back user agent with the network BE in order to provide all VoIP services to the customers transparently. CPBE 201 will also perform firewall functions and VoIP Quality of Service (QoS) control in accordance with the policies established by the core VoIP network and will detect DTMF digits and strings sent by customers and will relay those digits/strings to application servers via the network BE. As also discussed above, in another illustrative embodiment CPBE 201 can provide media transcoding as directed by the network BE/CCE for media transcoding as required, thus removing this hardware-intensive operation from the core network equipment. CPBE 201 can also, illustratively, function as a VoIP gateway that will provide interworking between the VoIP network and circuit-switched telephony network.

One skilled in the art will recognize in light of the foregoing that other functions can also be integrated into a CPBE, such as CPBE 201. For example, a CPBE may perform various functions that would normally be performed in the network-based BE or other element of the core network, such as, illustratively, call routing, media transcoding, call admission control/QOS, FW/NAT, and media relay. Any function performed specifically within the customer premises is referred to herein as a customer premises function. For example, if a call arrives at the CPBE from within or outside the customer premises destined for another location within the customer premises, the CPBE may, illustratively, route the call within the customer premises without the need to forward the call to the network BE for certain processing functions. Thus, the network BE does not require any information about the customer premises in order to route calls within the premises network. Another function that may be directly integrated into the CPBE is, for example, a terminal adapter functionality for interfacing analog telephones with the VoIP network, thus providing seamless and transparent telephony to both IP telephones and analog telephones. Additionally, routing functionality, domain name server/dynamic host configuration protocol (DNS/DHCP) functionality and wireless access point functionality can be implemented directly into the CPBE 201, if desired, to resolve/provide IP addresses to customer devices and to prevent the need for external routers and access points to network multiple wired and wireless customer devices to the VoIP network.

However, while in accordance with the principles of the present invention the CPBE will be performing a number of the functions of the network BE, the number of calls required to be supported by such a CPBE will be much lower than if the network BE were performing those functions for all calls in a given geographic region. In addition, many of the configuration settings (e.g., settings necessary to enforce QoS requirements) are generated by and received from the network and, therefore, separate decision mechanisms related to such functions (e.g., QoS) can be reduced in scope in a CPBE. Thus, the CPBE 201 is not required to be as robust as the network BE. Another advantage of such an implementation is that, when CPBEs are used at multiple customers' premises, the network BEs will not require the complexity required to connect with the large number of potential SIP-based devices. Therefore, the network BEs can also be designed with reduced capacity handling capabilities and, therefore, costs associated with installing, operating and maintaining the network BEs will be reduced.

Figure 4:
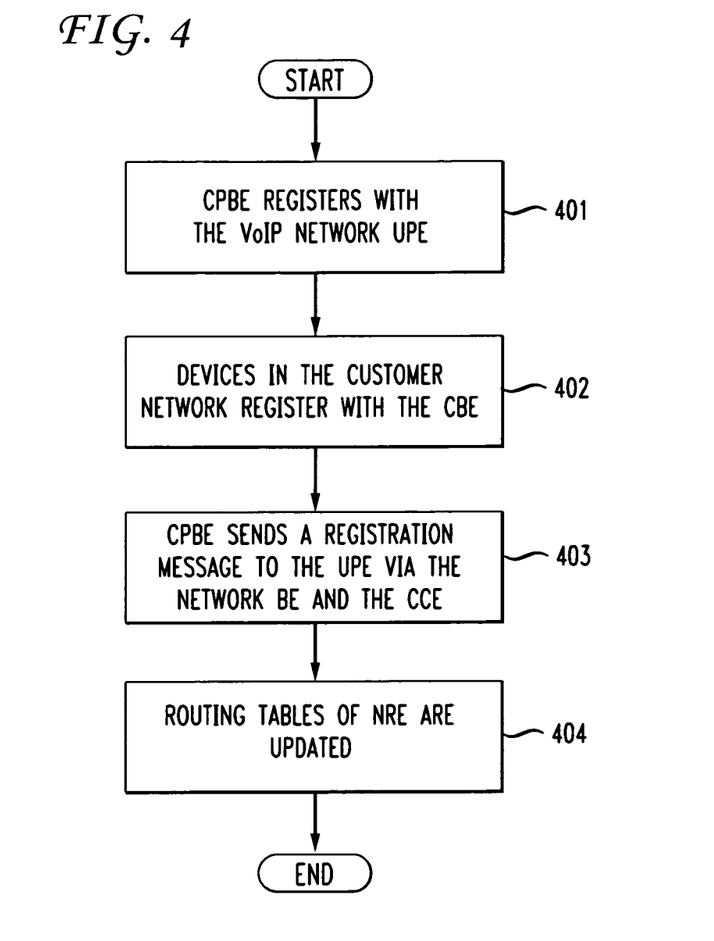
FIG. 4 shows the steps of a method for registering a customer premises border element and user communications devices with a telephony network.

FIG. 4 shows a method in accordance with the principles of the present invention whereby a CPBE, such as CPBE 201 in FIG. 2 is setup prior to any calls being placed. At step 401, the CPBE registers with the VoIP network UPE that contains routing information for all CPBEs and network BEs. In one illustrative embodiment, the routing table of the UPE is the same routing table used by the network routing engine NRE in the core VoIP network. CPBEs are identified in the routing table according to the public IP address provided by the CPBE firewall/NAT functionality. Next, at step 402, each of the voice-based devices in the customer network register the CBE using the private IP address assigned to it by the CPBE or other DHCP functionality. In turn, at step 403, the CPBE sends a registration message to the UPE via the network BE and the CCE in order to, at step 404, update the routing tables of the NRE. In one illustrative embodiment, the NRE also maintains private IP addresses (e.g., the addresses used by customer premises network as assigned by the CPBE) or other information that will permit the NRE to route a call directly to a customer device even though that device is behind the firewall/NAT function of the CPBE. Alternatively, the NRE can simply contain the public address of the customer device and the CPBE can provide any necessary address translation functions to route calls to the device.

Figure 5:
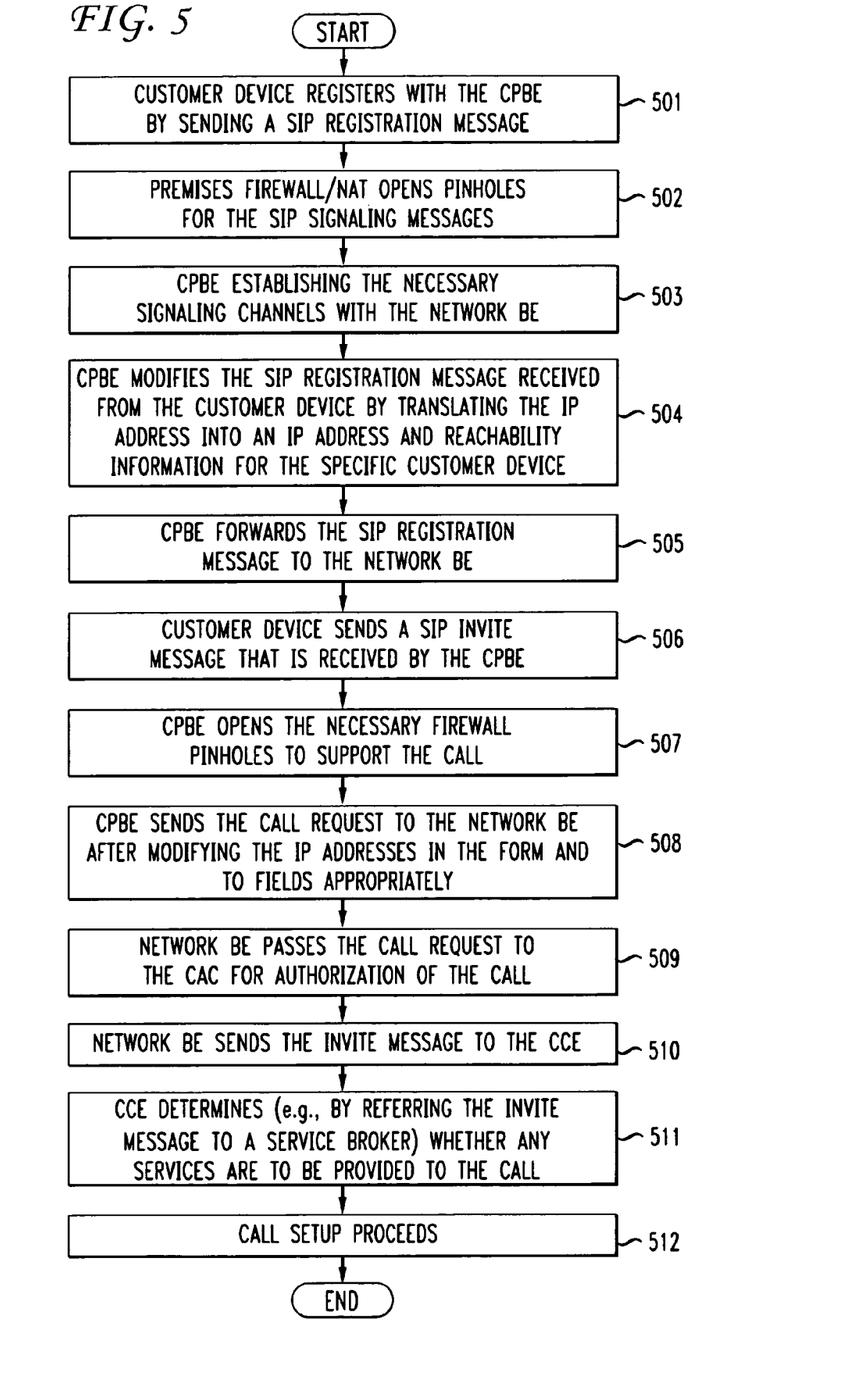
FIG. 5 shows the steps of an illustrative call flow in accordance with the principles of the present invention.

FIG. 5 shows an illustrative call flow for a simple call (e.g., requiring no applications) in accordance with the principles of the present invention. One skilled in the art will be able to appreciate in light of the present disclosure how more complex call flows can be implemented. At step 501, a customer device registers with the CPBE by sending a SIP registration message. At step 502 the premises firewall/NAT opens pinholes for the SIP signaling messages. Then, at step 503, the CPBE establishes the necessary signaling channels with the network BE with appropriate security and authentication. At step 504 the CPBE modifies the SIP registration message received from the customer device by translating the IP address into an IP address and reachability information for the specific customer device. Next, at step 505, the CPBE forwards the SIP registration message to the network BE. Once the customer has registered with the network, the customer can then make calls as desired. Specifically, when a call is desired, at step 506, the customer device sends a SIP INVITE message that is received by the CPBE. SIP INVITE messages are well known and will not be described in detail herein. At step 507, the CPBE opens the necessary firewall pinholes to support the call. At step 508, the CPBE sends the call request to the network BE after modifying the IP addresses in the from and to fields appropriately. Next, at step 509, the network BE passes the call request to the CAC for authorization of the call. Once the call is authenticated, at step 510 the network BE sends the INVITE message to the CCE. At step 511, the CCE determines (e.g., by referring the INVITE message to a service broker) whether any services are to be provided to the call. As discussed previously, in this case there are no such services to be provided. Call setup then proceeds, at step 512, as in a traditional call as discussed previously.

One skilled in the art will recognize that the various other advantages can be achieved by using CPBEs, such as CPBE 201. For example, in the case where both calling and called parties are using CPBEs, after authentication and call setup, any media streams can be transmitted directly between the CPBEs, for example via the Internet, thus reducing the load on the network BEs, even if each CPBE is controlled by a separate network BE. Additionally, if both the calling and called parties are in the same local network (e.g., a corporate LAN), those media streams could be transmitted via that local network instead of the Internet.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Other arrangements will also be obvious to those skilled in the art. For example, as discussed above, while the principles of the present invention are discussed herein in association with the wired voice networks, the principles of the present invention can be used with any method of communication. Those skilled in the art could implement various other feature combinations without departing from the scope and spirit of the invention.

The invention claimed is:
1. An apparatus, comprising:
a first border element comprising a processor located at a customer premises for:
receiving a first message at the first border element from a session initiation protocol-based communication device located at the customer premises, wherein the first border element is located at a border of the customer premises;

performing customer premises functions in response to the first message, wherein the customer premises functions comprise a call admission control function, a quality of service control function, a firewall control function, and a media relay function;

translating an address associated with the first message to a translated address associated with a second border element located at a border of a service provider voice over internet protocol network;

sending the first message to the second border element located at the border of the service provider voice over internet protocol network using the translated address, the second border element providing a single connection point for the first border element and the service provider voice over internet protocol network;

receiving from the second border element a second message indicative of a first quality of service to be provided by the first border element to a call in response to the first message, wherein the first quality of service is directed by the service provider voice over internet protocol network;

establishing the call using the first quality of service; and transcoding a first media stream associated with the call from a first format to a second format, wherein the transcoding is directed by the service provider voice over internet protocol network.

2. The apparatus of claim 1 wherein the first border element further comprises a firewall for sending the first message to the second border element and for controlling messages sent to and from the first border element.

3. The apparatus of claim 1 further comprising:
a network element in the service provider network for relaying the first media stream from the first border element to a third border element located at a second customer premises.

4. A method for registering a session initiation protocol-based communication device with a voice over internet protocol network comprising:

sending a first registration message from a first border element comprising a processor located at a border of a customer premises to a second border element located at a border of a network provider voice over internet protocol network, wherein the first border element performs a call admission control function, a quality of service control function, a firewall control function, and a media relay function;

receiving at the first border element a second registration message from the session initiation protocol-based communication device;

translating, by the first border element, an address associated with the second registration message to create a translated address;

sending, by the first border element, the second registration message having the translated address to the second border element located at the border of the network provider voice over Internet protocol network, the second border element providing a single connection point for the first border element and the network provider voice over internet protocol network;

receiving at the first border element from the second border element a message indicative of a first quality of service to be provided by the first border element to a call after the sending of the second registration message, wherein the first quality of service is directed by the network provider voice over internet protocol network;

establishing the call, by the first border element, using the first quality of service; and transcoding, by the first border element, a first media stream associated with the call from a first format to a second format, wherein the transcoding is directed by the network provider voice over internet protocol network.

5. The method of claim 4 wherein the first registration message comprises a message to register the first border element with the network provider voice over internet protocol network.

6. The method of claim 4 wherein the second registration message comprises a message to register the session initiation protocol-based communication device with the network provider voice over internet protocol network.

7. A method for processing a call at a first border element located at a first customer premises, the method comprising:

receiving an INVITE message, by the first border element comprising a processor, from a customer communication device, wherein the first border element is located at a border of the first customer premises, wherein the first border element performs a call admission control function, a quality of service control function, a firewall control function, and a media relay function;

translating, by the first border element, a first address associated with the INVITE message to provide a translated address;

sending the INVITE message, by the first border element, to a network border element located at a border of a network provider voice over internet protocol network using the translated address, the network border element providing a single connection point for the first border element and the network provider voice over internet protocol network;

receiving, by the first border element, from the network border element a message indicative of a first quality of service to be provided to a call by the first border element in response to the INVITE message, wherein the first quality of service is directed by the network provider voice over internet protocol network;

establishing the call, by the first border element, using the first quality of service; and transcoding a first media stream associated with the call, by the first border element, wherein the transcoding is directed by the network provider voice over internet protocol network.

8. The method of claim 7 wherein the sending comprises opening a communication path through a firewall for controlling messages sent to and from the first border element.

9. The method of claim 7 further comprising relaying the first media stream from the first border element to a second border element located at a second customer premises.

* * * * *